Jan. 11, 1966 R. H. ROSBACK ETAL 3,228,418

CHECK VALVE

Filed Sept. 12, 1962

INVENTOR
RICHARD H. ROSBACK
CHARLIE N. FRENCH
BY
Richard A. Deib

ATTORNEY

United States Patent Office 3,228,418
Patented Jan. 11, 1966

3,228,418
CHECK VALVE
Richard H. Rosback and Charlie N. French, South Bend, Ind., assignors to The Bendix Corporation, South Bend, Ind., a corporation of Delaware
Filed Sept. 12, 1962, Ser. No. 223,195
1 Claim. (Cl. 137—516.17)

This invention relates to a check valve construction.

It is the principal object of this invention to provide a check valve construction which is constructed from plastic parts and is adapted to provide a positive engagement valve arrangement which is simple, rugged, and inexpensive to manufacture.

It is another object of our invention to provide a check valve adapted to maintain a unidirectional flow within a passage subjected to differential pressures.

A still further object of the present invention is the provision of new and improved means for simply and inexpensively sealingly attaching a valve body to a plate structure.

It is still another object of this invention to provide a check valve which allows flow only in the event of a pressure differential.

The invention resides in certain constructions and combinations and arrangements of parts; and further objects and advantages of the invention will became apparent to those skilled in the art to which the invention relates from the following description of the preferred embodiment described with reference to the accompanying drawings forming a part of this specification, and in which.

Figure 1:
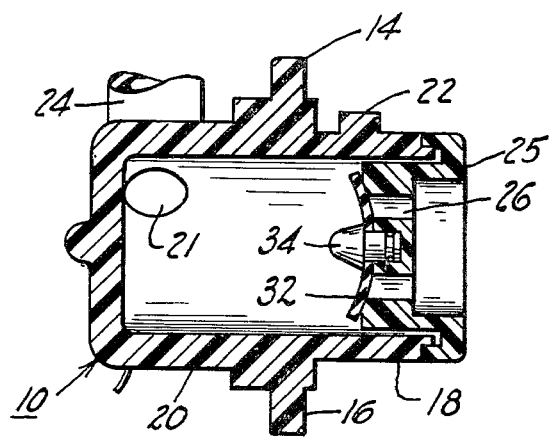
FIGURE 1 is a cross sectional view of a check valve structure in accordance with the principles of the present invention.

Although the invention may be otherwise embodied, it is suggested that the check valve body 10 can be united with a section of a stamped sheet metal shell, as suggested in a copending U.S. application Serial No. 78,125, now abandoned, assigned to the common assignee.

In order to further understand such as assembly, the tubular valve body has a generally radially extending flange 14 providing a shoulder 16. The tubular check valve also includes a cylindrical body section 18 which projects from the shoulder 16, and also includes a generally tubular portion 20 on the opposite side of the flange 14 with regard to the body section 18. The tubular portion 20 may be provided with an annular opening 21 to which a vacuum hose 24 may be attached, as by any appropriate fitting. If desired, the tubular portion 20 may be formed as in the above-mentioned copending U.S. application Serial No. 78,125 to provide for the attachment of a vacuum hose, as by clamping thereto.

As suggested in the copending application, a sheet metal housing is provided with an opening therethrough, the main portion of which is shaped to receive the cylindrical body section 18 of the tubular body 10. The opening further includes at least two radially outwardly extending notched portions that are shaped to receive corresponding fingers 22 which are formed radially on the periphery of the cylindrical body section 18, and are spaced from the shoulder 16 by a distance greater than the thickness of the sheet metal housing. Thus, the assembly of our check valve to the sheet metal housing will be the same as in the copending application mentioned.

Figure 2:
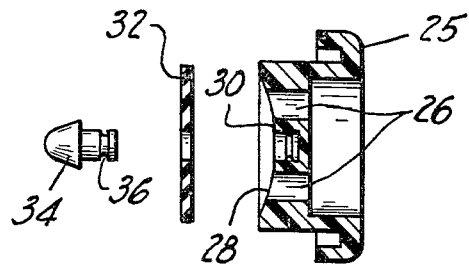
FIGURE 2 is a detailed cross sectional view of a valve portion of the check valve with the parts thereof individually shown prior to assembly.
Figure 3:
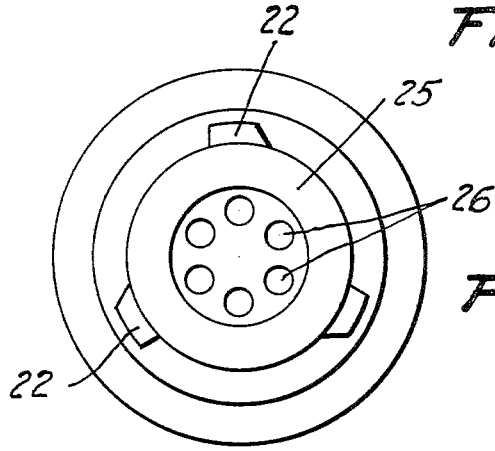
FIGURE 3 is an end view of the check valve structure showing the ears that allow the valve body to be positioned to other structure.

As for the particular details of our check valve, attention is directed to FIGURE 2 showing a closure member 25, which closure is spin welded to the cylindrical body section 18 of the valve body 10. The closure is also provided with a series of openings 26 shown as a plurality of passages spaced circumferentially about the axis of the closure 25. If desired, these passages may be united to form kidney-type openings through the closure. The closure also is formed to provide a concave valve seat 28 about a center portion 30. To complete the valve assembly, we have taken a flexible plate or washer 32 made of thin sheet metal, rubber or of elastomeric composition and snapped it into place against the concave valve seat 28 by means of a threadless fastener 34 held by the center portion 30 which grips the annular recess 36 of the threadless fastener (see FIGURE 1).

In operation, the vacuum supplied by the hose 24 will readily collapse the elastomeric washer 32 about the conical head of the threadless fastener 34 to open the passages 26 to remove air from any chamber therebehind. Due to the concave setting of the elastomeric washer 32 in its seating with the valve seat 28, the washer 32 is, generally speaking, biased to allow a pressure differential to open the valve when the pressure behind or to the right of the valve is greater than that to the left, as viewed in FIGURE 1. However, this also means that when the pressure differential is reversed, the elastomeric washer is pressed harder against the surrounding valve seat 28.

While the invention has been described as utilizing a generally circular valve body, the invention is not to be construed as being limited thereto, and in some instances, the valve body may be of a triangular or square shape.

In addition, we do not wish to be limited to the particular construction shown and described, as such was merely to comply with appropriate statutes; and it is our intention to cover hereby all novel adaptations, modifications and arrangements thereof which come within the practice of those skilled in the art to which the invention relates.

We claim:

A pressure differential check valve comprising:
a one-piece plastic hollow body open at one end and having a drilled passage at the other end, said body being provided with ears for holding said body to another structure;
an end closure member integrally connected to said body at said open end to close said body and form a chamber between said drilled passage and said end closure, which end closure member is provided with a plurality of passages through said end closure which passages are radially displaced from an axis of said end closure, said end closure also including a closed bore centrally of said passages, said bore having means to receive a threadless fastener and grip said fastener, said end closure having a center portion surrounding said bore of lesser axial dimension than a radial portion surrounding said passages through said end structure to provide a concave valve seat;
a flat, rubber washer having a central opening therethrough receiving said threadless fastener which opening is sized so that said threadless fastener will form an abutment for the rubber washer when said threadless fastener is snapped into said bore of said end closure to hold said rubber washer to said end closure while convexly upsetting said rubber washer to engage the center and radial portions of said end closure member, said rubber washer being of a radial dimension to bridge the passages and contact the end closure on an area sufficient to preclude extrusion of said rubber washer when high pressure fluid is communicated to said chamber through said drilled passage; and means connecting said drilled passage to a fluid pressure source which is of such a nature as to normally pull said rubber washer from said end closure to communicate the passages through said end closure to said chamber.

References Cited by the Examiner

UNITED STATES PATENTS

| | | | |
|---|---|---|---|
| 928,813 | 7/1909 | Spikes | 137—588 |
| 2,174,503 | 9/1939 | Whipple | 137—525 XR |
| 2,291,603 | 8/1942 | Barker | 137—512.15 |
| 2,785,830 | 3/1957 | Bauerlein | 137—525 XR |
| 2,789,577 | 4/1957 | Hosking | 137—525 XR |
| 3,059,666 | 10/1962 | Lodge | 137—512 |
| 3,086,544 | 4/1963 | Yost | 251—367 XR |

M. CARY NELSON, *Primary Examiner.*

ISADOR WEIL, MARTIN P. SCHWADRON,
*Examiners.*